US006910596B2

(12) United States Patent
Herckner

(10) Patent No.: US 6,910,596 B2
(45) Date of Patent: Jun. 28, 2005

(54) WATER BOTTLE WITH HANDLE

(76) Inventor: Harry M. Herckner, 37 Oakwood Dr., Medford, NJ (US) 08055

( * ) Notice: Subject to any disclaimer, the term of this patent is extended or adjusted under 35 U.S.C. 154(b) by 21 days.

(21) Appl. No.: 10/361,532

(22) Filed: Feb. 10, 2003

(65) Prior Publication Data
US 2003/0173328 A1 Sep. 18, 2003

Related U.S. Application Data
(60) Provisional application No. 60/319,684, filed on Nov. 11, 2002, and provisional application No. 60/355,933, filed on Feb. 11, 2002.

(51) Int. Cl.[7] ............................................. B65D 23/10
(52) U.S. Cl. ...................................... 215/398; 220/771
(58) Field of Search ............................... 215/384, 385, 215/396, 398; 220/771; 264/523, 529, 531

(56) References Cited

U.S. PATENT DOCUMENTS

| 3,120,679 | A | * | 2/1964 | Price et al. ................. 264/540 |
| 3,278,666 | A | * | 10/1966 | Donald ........................ 264/540 |
| 3,399,424 | A | * | 9/1968 | Sheptak et al. ............. 425/156 |
| 3,579,620 | A | * | 5/1971 | Pettersson ................... 264/520 |
| 3,640,672 | A | * | 2/1972 | Starr .......................... 425/525 |
| 3,665,063 | A | * | 5/1972 | Rupert et al. ............... 264/529 |
| 3,892,513 | A | * | 7/1975 | Mehnert et al. ............ 425/525 |
| 3,944,642 | A | * | 3/1976 | Uhlig .......................... 264/530 |
| 4,257,525 | A | * | 3/1981 | Thompson ................. 215/396 |
| 4,805,808 | A | * | 2/1989 | Larson ...................... 222/185.1 |
| 4,846,359 | A | * | 7/1989 | Baird et al. ................. 215/12.2 |
| 4,892,207 | A | * | 1/1990 | Cullis .......................... 215/398 |
| 4,988,279 | A | * | 1/1991 | Belcher ....................... 425/525 |
| 4,993,931 | A | * | 2/1991 | Belcher ....................... 425/112 |
| D339,067 | S | * | 9/1993 | Rokus ......................... D9/531 |
| 5,275,780 | A | * | 1/1994 | Robinson .................... 264/529 |
| 5,366,101 | A | * | 11/1994 | Krall et al. .................. 215/398 |
| 5,392,950 | A | | 2/1995 | Foss et al. |
| 5,556,648 | A | * | 9/1996 | Budzynski et al. ......... 425/150 |
| 5,836,469 | A | * | 11/1998 | Zebrowski .................. 215/384 |
| D401,859 | S | | 12/1998 | Rokus |
| 5,954,216 | A | | 9/1999 | Meisner et al. |
| D419,885 | S | * | 2/2000 | Gonzalez C. ............... D9/531 |
| D474,692 | S | * | 5/2003 | Yu .............................. D9/531 |
| 2002/0171161 | A1 | * | 11/2002 | Belcher |

FOREIGN PATENT DOCUMENTS

| EP | 0346518 A1 | * | 12/1989 | |
| EP | 1059237 A1 | * | 12/2000 | ........... B65D/23/10 |
| JP | 361043535 A | * | 3/1986 | |

* cited by examiner

Primary Examiner—Sue A. Weaver
(74) Attorney, Agent, or Firm—RatnerPrestia

(57) ABSTRACT

A liquid storage bottle is provided with a generally cylindrical liquid storage chamber and an integral handle. A well is formed in the liquid storage chamber to accommodate the handle. The walls of the well are configured to prevent water from pooling thereon, and to allow a cleaning fluid to reach all inside surfaces of the bottle. The handle is configured for ease of cleaning the bottle. In one exemplary embodiment, the handle is closed-off from the liquid storage chamber. In another exemplary embodiment, the handle is configured to allow a water-safe cap easily to pass therethrough.

18 Claims, 10 Drawing Sheets

WATER BOTTLE WITH HANDLE

CROSS REFERENCE TO RELATED APPLICATIONS

This application claims priority of U.S. Provisional Application No. 60/355,933 filed on Feb. 11, 2002 and U.S. Provisional Application No. 60/319,684 filed on Nov. 11, 2002.

TECHNICAL FIELD

This invention relates to a reusable liquid storage bottle with an integral handle and more particularly to a 5-gallon water bottle conforming to an industry standard envelope and having an integral handle configured so that all inside surfaces of the bottle are adequately cleaned for consumer safety.

BACKGROUND OF THE INVENTION

Reusable liquid storage bottles are employed in the storage and delivery of various beverages such as bottled water. Typically, 5-gallon water bottles are repeatedly washed and filled for up to ten years. These bottles are typically blow molded using polymer resins such as a polycarbonate. Larger water bottles (e.g., the 5-gallon bottle) may be provided with an integral handle for ease of handling. Industries like the bottled water industry are highly competitive, and the cost of producing and cleaning storage bottles is a significant factor in the success of companies in these industries.

Because the contents of these bottles are intended for human consumption, they must be thoroughly cleaned between uses to prevent the growth of bacteria and other harmful conditions. To clean reusable water bottles, the bottles are inverted and hot water is sprayed into them through the bottle opening under pressure. A handle may be formed in a 5-gallon water bottle by forming a well in the main body of the bottle with an aperture between the main body and the handle. The main body and handle are closed-off from this aperture by walls of the main body and handle respectively. A water-safe plug, which is pushed into the bottle when it is inserted on a water cooler, may become lodged in this integral handle. Costly inspection and off-line removal steps may be needed to assure that a water-safe plug is not lodged in the handle. Also, the well can cause the cleaning fluid to miss or inadequately contact a portion of the interior surface of the bottle, particularly the handle and the portion of the bottle that is below the well during cleaning (the bottle is cleaned in an inverted position).

To overcome the shortcomings of liquid storage bottles with an integral handle, a new method and apparatus for liquid storage is provided. An object of the present invention is to provide an improved storage bottle with an integral handle that is easier and more economical to clean than existing bottles. A related object of the present invention is an economical method for manufacturing a bottle with an integral handle that is easier to clean.

SUMMARY OF THE INVENTION

To achieve this and other objects, and in view of its purposes, the present invention provides a blow molded liquid storage bottle with a handle which is not difficult to clean and a method for producing the same. In one embodiment of the present invention, a reusable blow molded liquid storage bottle is provided having:

a liquid storage chamber having a generally cylindrical shape with a longitudinal axis and an opening at one end of the chamber for introducing liquid to the chamber and removing liquid from the chamber; the liquid storage chamber having a well or indentation to receive a handle, which well comprises a taper or a continuous longitudinal curve each of the tangent lines of which intersects the longitudinal axis at an angle of less than about 87 degrees and more preferably less than about 70 degrees; and a handle located in the well, integral with the chamber, and having a geometry at the intersection of the handle and the chamber with effective cross-sectional dimensions that close-off the handle from the liquid storage chamber.

In another embodiment of the present invention, a reusable blow molded liquid storage bottle is provided having a generally cylindrical shaped liquid storage chamber with a longitudinal axis and well formed therein. The well defines an integral handle sized and configured to allow a water-safe plug to pass through the handle. The well comprises a taper or a continuous longitudinal curve each of the tangent lines of which intersects the longitudinal axis at an angle of less than about 87 degrees and more preferably less than about 70 degrees.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
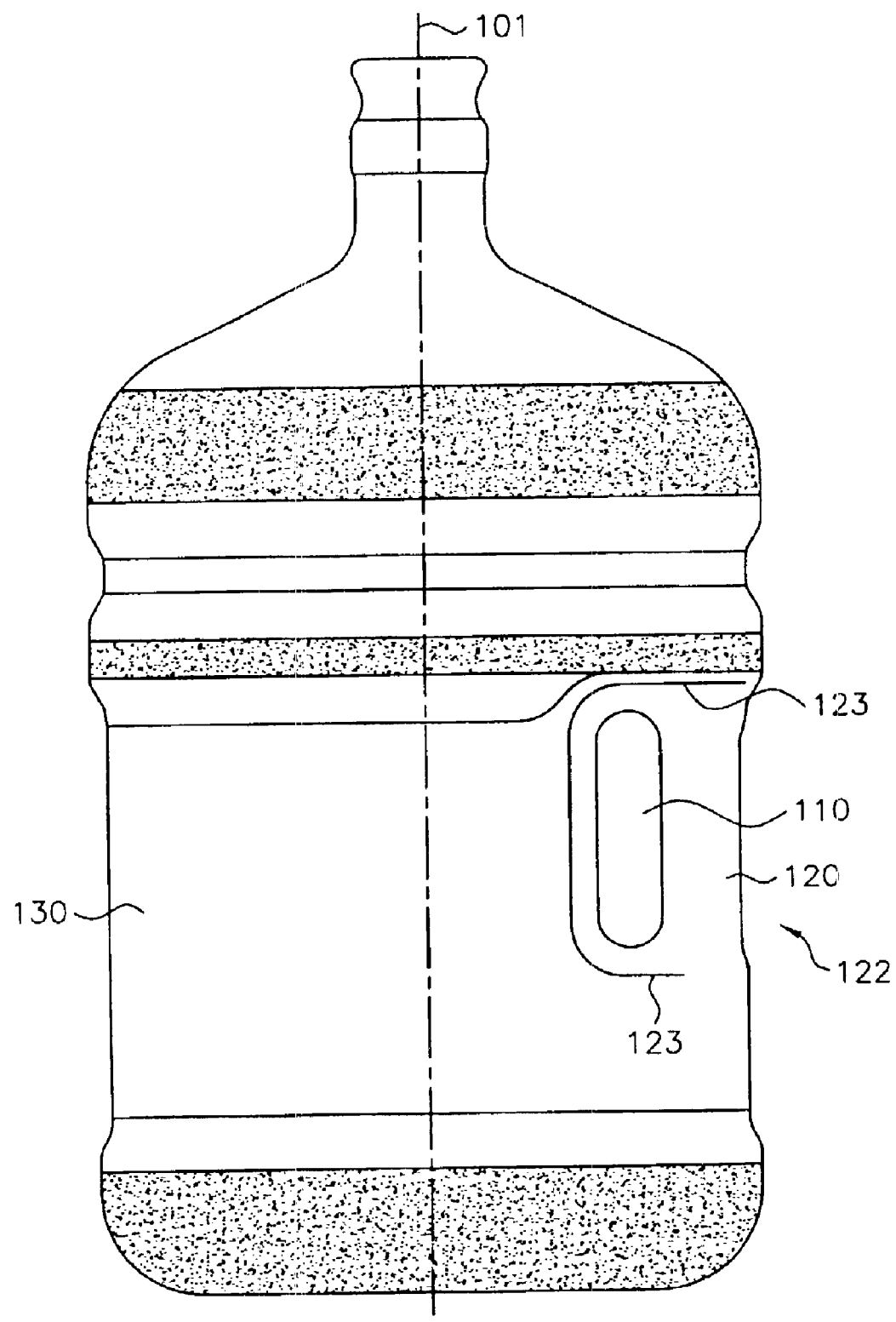
FIG. 1 is a water bottle with a flow-through or open handle according to the prior art.

Referring now to the drawing, in which like reference numbers refer to like elements throughout, FIG. 1 shows a prior art blow-molded water bottle with an integral handle. A generally cylindrical polymer tube or parison is positioned over a blow pin. A tool, called a mold is formed in two or more parts, each having a cavity corresponding to a portion of the outside contour of a liquid storage bottle. Air is blown into the parison to expand its internal dimensions. The two parts of the mold are pressed together, defining the contour of the bottle. When the two parts of the mold are pressed together, a generally cylindrical liquid storage chamber 130 and a handle 120 are formed. An aperture 110 is formed between the handle 120 and the generally cylindrical liquid storage chamber 130 of the bottle. The handle 120 is a hollow cylinder open to the generally cylindrical liquid storage chamber 130 at both ends of the handle. A handle indentation or well 122 extends from two locations along the circumference of the generally cylindrical liquid storage chamber inwardly to a parting line approximately on a plane passing through the axis of the handle and the axis of the generally cylindrical liquid storage chamber. In existing water bottles, well 122 comprises two edges 123 that are generally perpendicular to longitudinal axis 101. Although the exemplary embodiment of the invention is described with reference to a generally cylindrical five-gallon water bottle, it is contemplated that it may be practiced with water bottles of other sizes and shapes, for example, three-gallon or four-gallon bottles or bottles having generally polygonal cross-sections.

Figure 2:
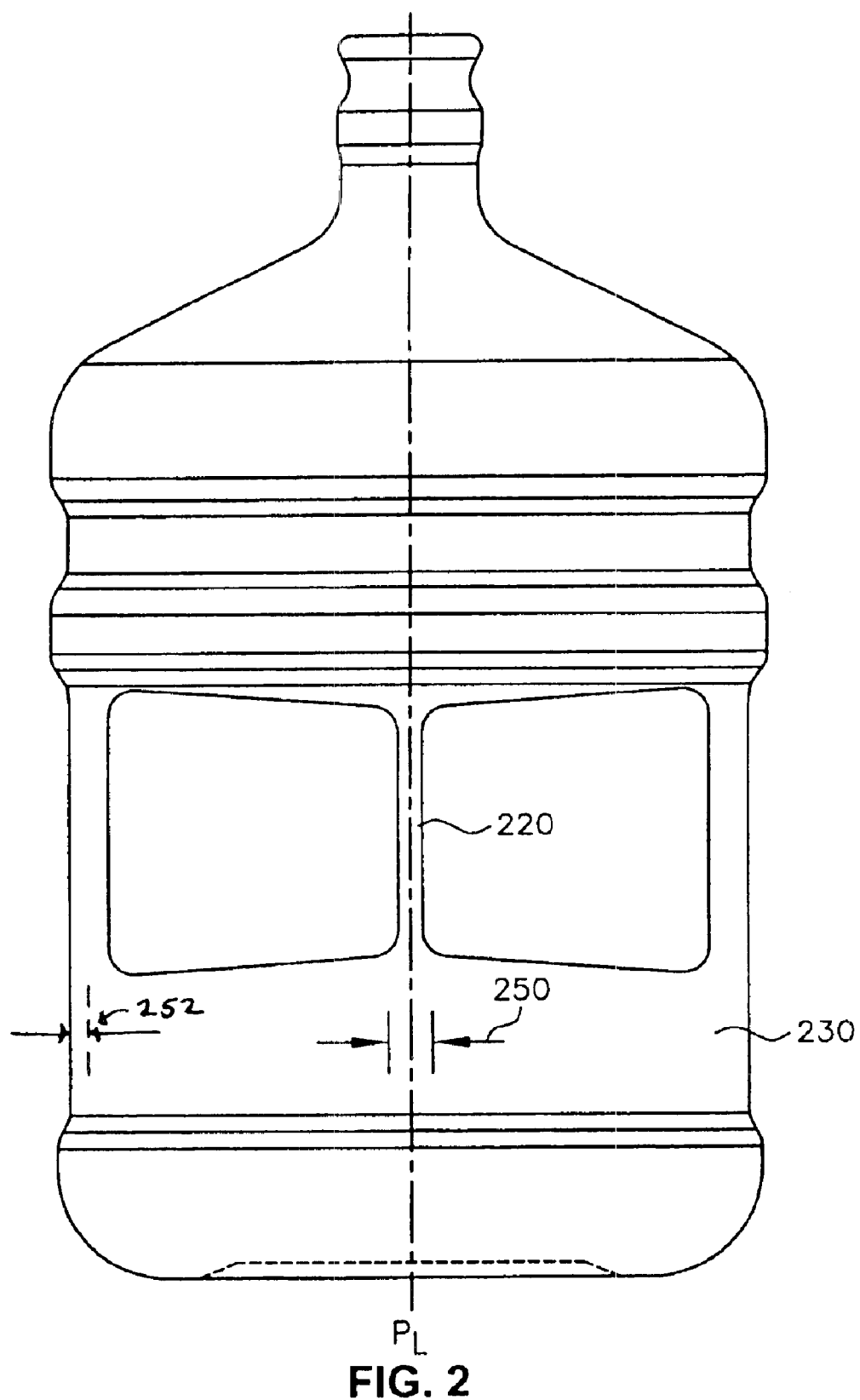
FIG. 2 is a water bottle with a closed-off handle according to one embodiment of the present invention.
Figures 3, 4:
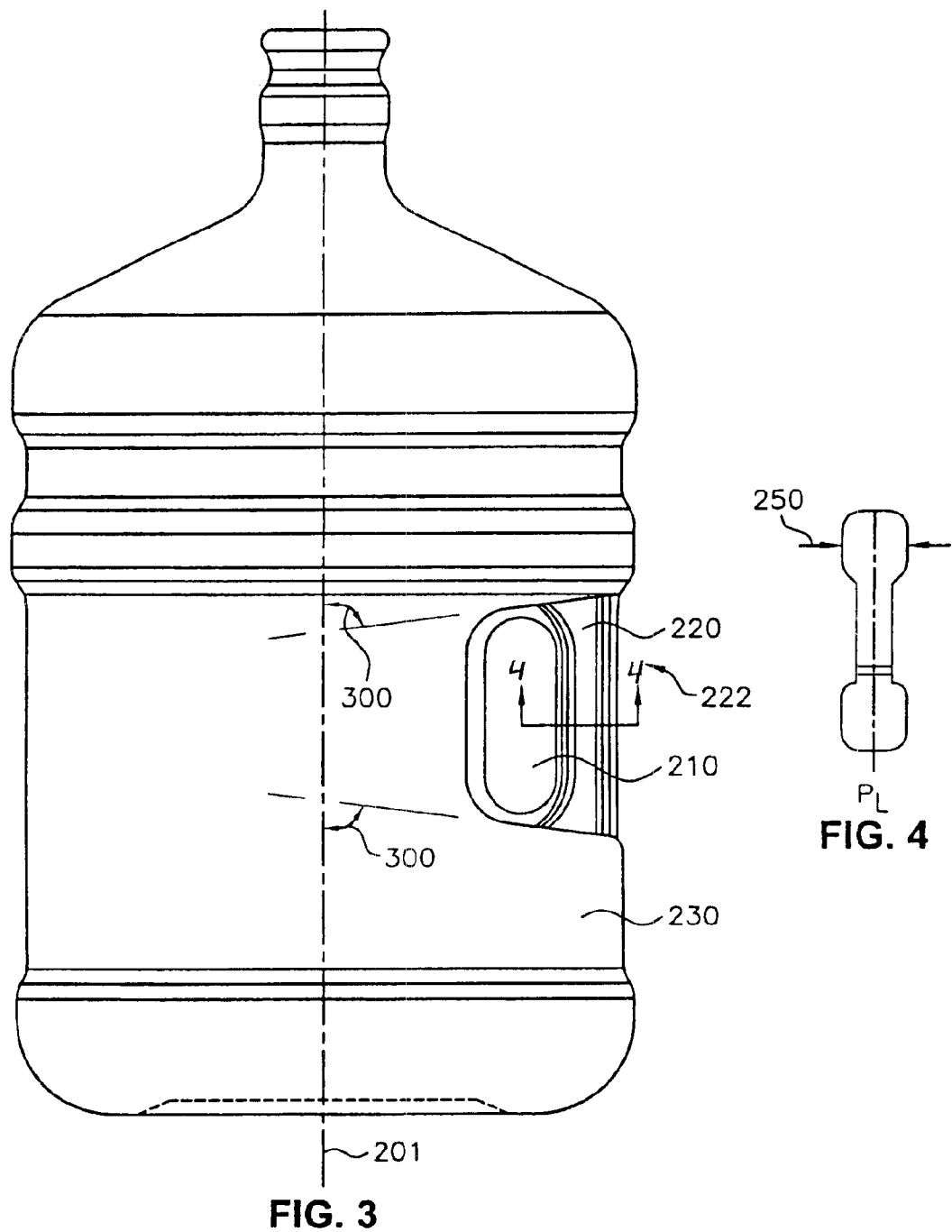
FIG. 3 is a side view of the water bottle in FIG. 2.
FIG. 4 is a cross-sectional view of the handle of the water bottle of FIGS. 2–3 taken along axis 4—4 in FIG. 3.

FIGS. 2–4 show a bottle formed according to one embodiment of the present invention. This bottle is blow molded, and has an aperture 210 separating a handle 220 from a generally cylindrical liquid storage chamber 230. Aperture 210 and handle 220 are disposed in an indentation or well 222 formed in the generally cylindrical liquid storage chamber 230. The bottle according to this embodiment of the present invention, however, has a handle 220 that is configured to be closed off from chamber 230. As shown in FIG. 4, the handle has cross-sectional dimensions that are sufficiently small so that the polymer material is pressed together to form a solid cross section where handle 220 joins (or intersects) chamber 230. This closed-off handle 220 is advantageous because it eliminates the small handle opening of the prior art that is difficult and expensive to clean, and can promote bacteria growth.

In order to completely close-off handle 220 from chamber 230, each cross-section in the exemplary embodiment has an effective dimension 250 sized to fill completely with the polymer material from the bottle walls. Preferably, each cross-section should have a smallest dimension that is two or fewer times the wall thickness of the bottle 252. The cross-sectional shape and dimensions, however, desirably provides sufficient strength to support the weight of a full water bottle. Also, handle 220 is desirably sized and contoured to be held comfortably by a human hand. Accordingly, in one embodiment as shown in FIG. 4, handle 220 has a shape that is generally like an I-beam. The I-beam shape provides greater bending strength than a uniformly thin handle having a small enough cross-section to close-off the handle. Also, polycarbonate shrinks slightly during cooling, so that a larger cross-section of material intersecting a wall would cause a small depression, called a "sink". When the bottle is inverted for cleaning, water would be able to pool in a sink where the handle meets the wall of the storage chamber.

Figure 6:
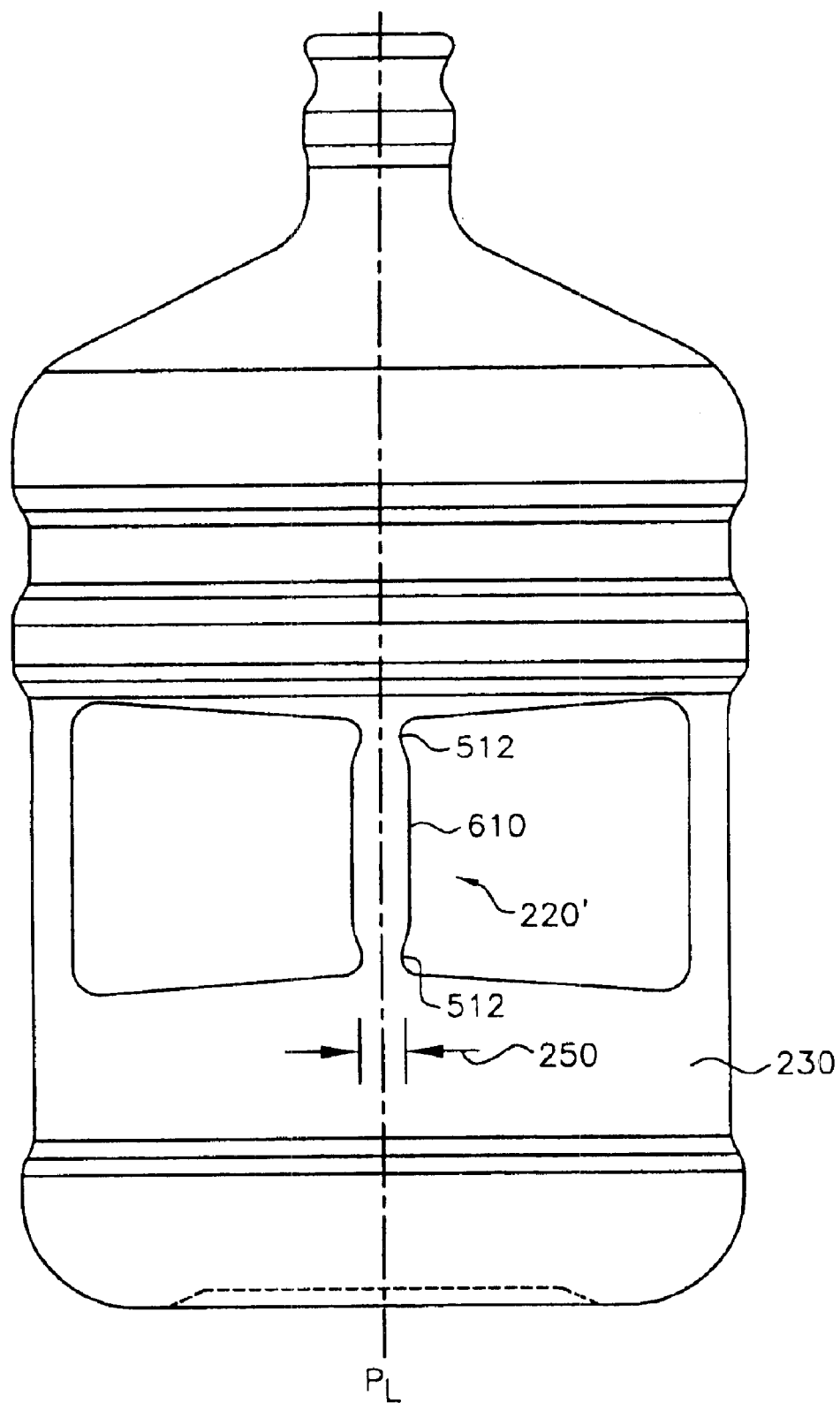
FIG. 6 is a back view of an alternative water bottle configuration with a closed-off handle.
Figure 7:
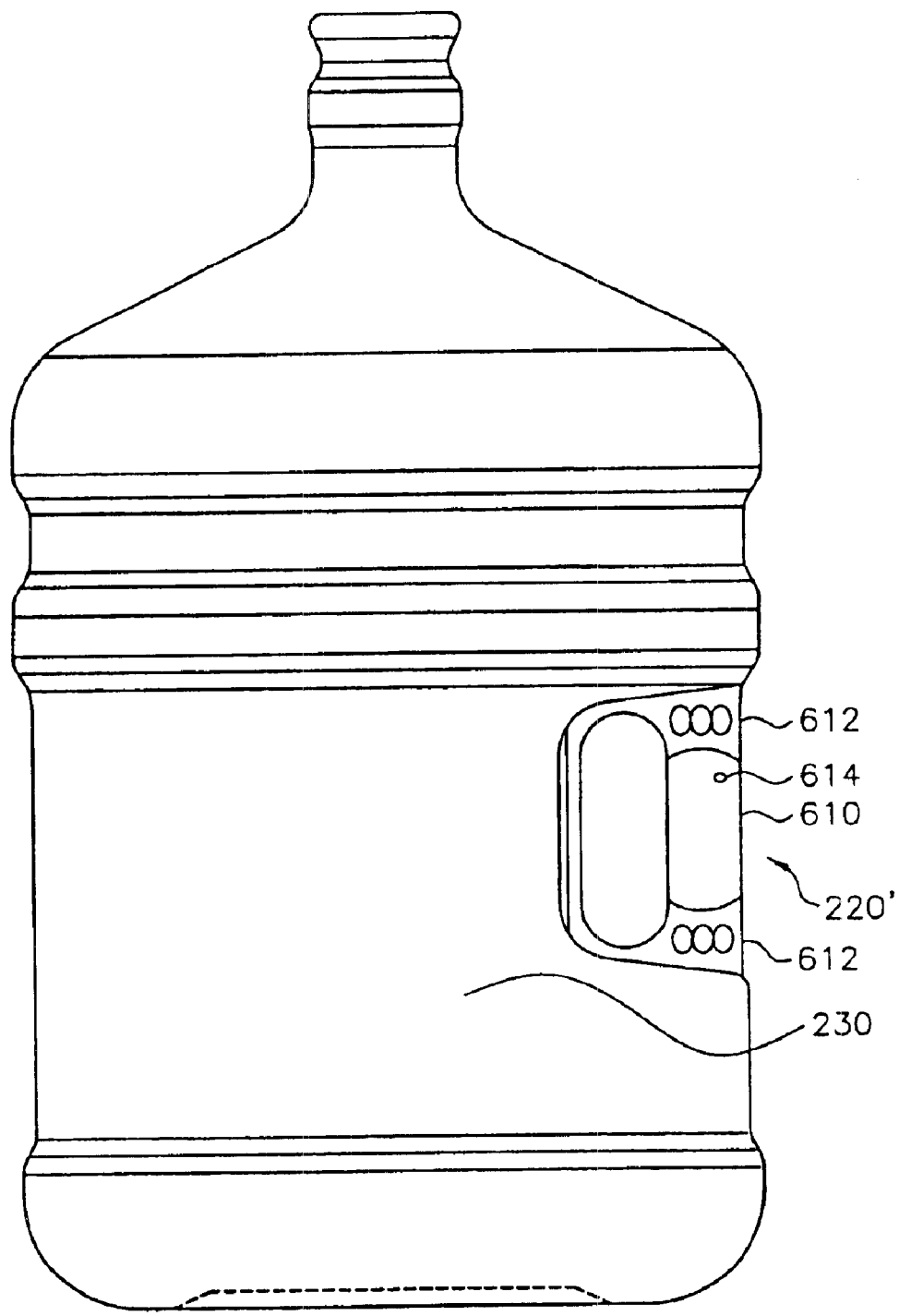
FIG. 7 is a side view of the alternative water bottle configuration shown in FIG. 6.
Figure 8:
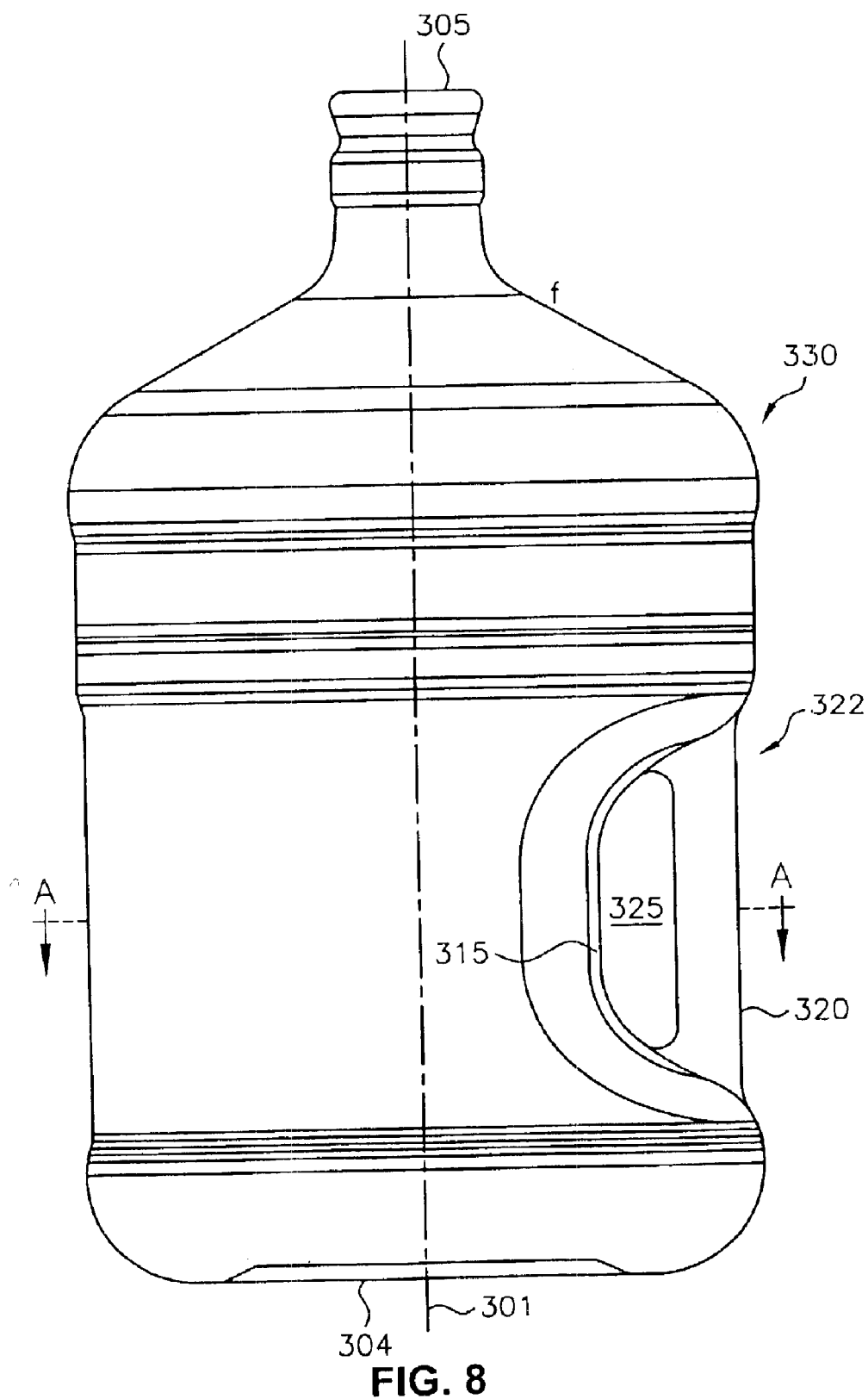
FIG. 8 is a bottle with an improved flow-through handle and well according to one embodiment of the present invention.
Figure 9:
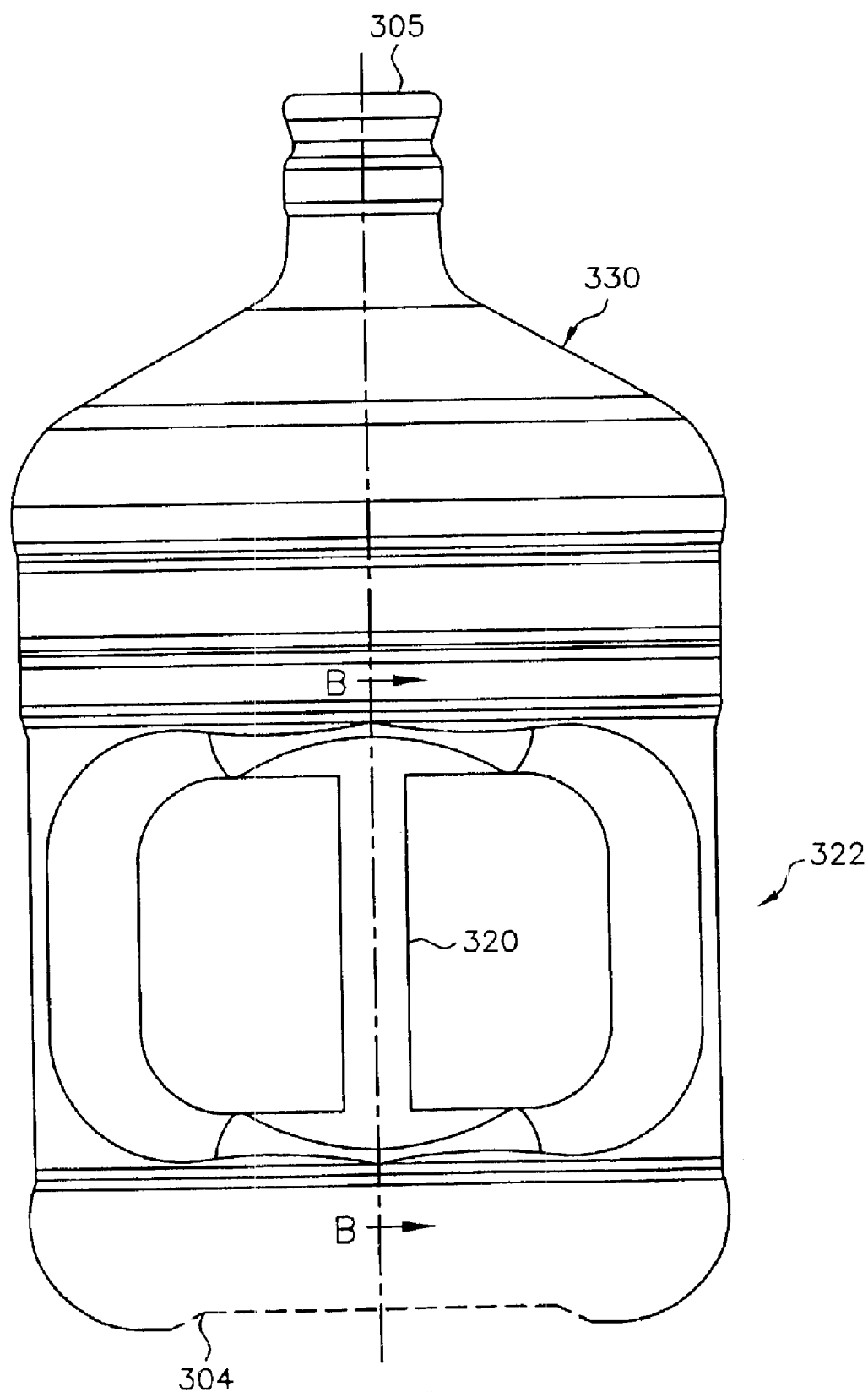
FIG. 9 is a side view of the water bottle in FIG. 8.

The handle 220 may have effective cross-sectional dimensions along its entire length, as shown in FIGS. 2–4. Alternatively, as shown in FIGS. 6 and 7, handle 220' may be configured to have effective cross-sectional dimensions to close-off the handle from the storage chamber, at locations 512, proximate the portions of the chamber wall 612 that separate the handle from the chamber, while the rest of the handle is configured as a hollow tube 610. It should be understood that while an I-beam cross-sectional shape, as illustrated and described in FIGS. 2, 3 and 4, provides an effective cross-sectional dimension to close-off the handle and sufficient strength to support the bottle when full, other shapes are contemplated and are within the scope of the invention. Alternate handle shapes desirably provide an effective dimension for closing-off the handle and they also provide sufficient strength for supporting the bottle when full.

Figure 5:
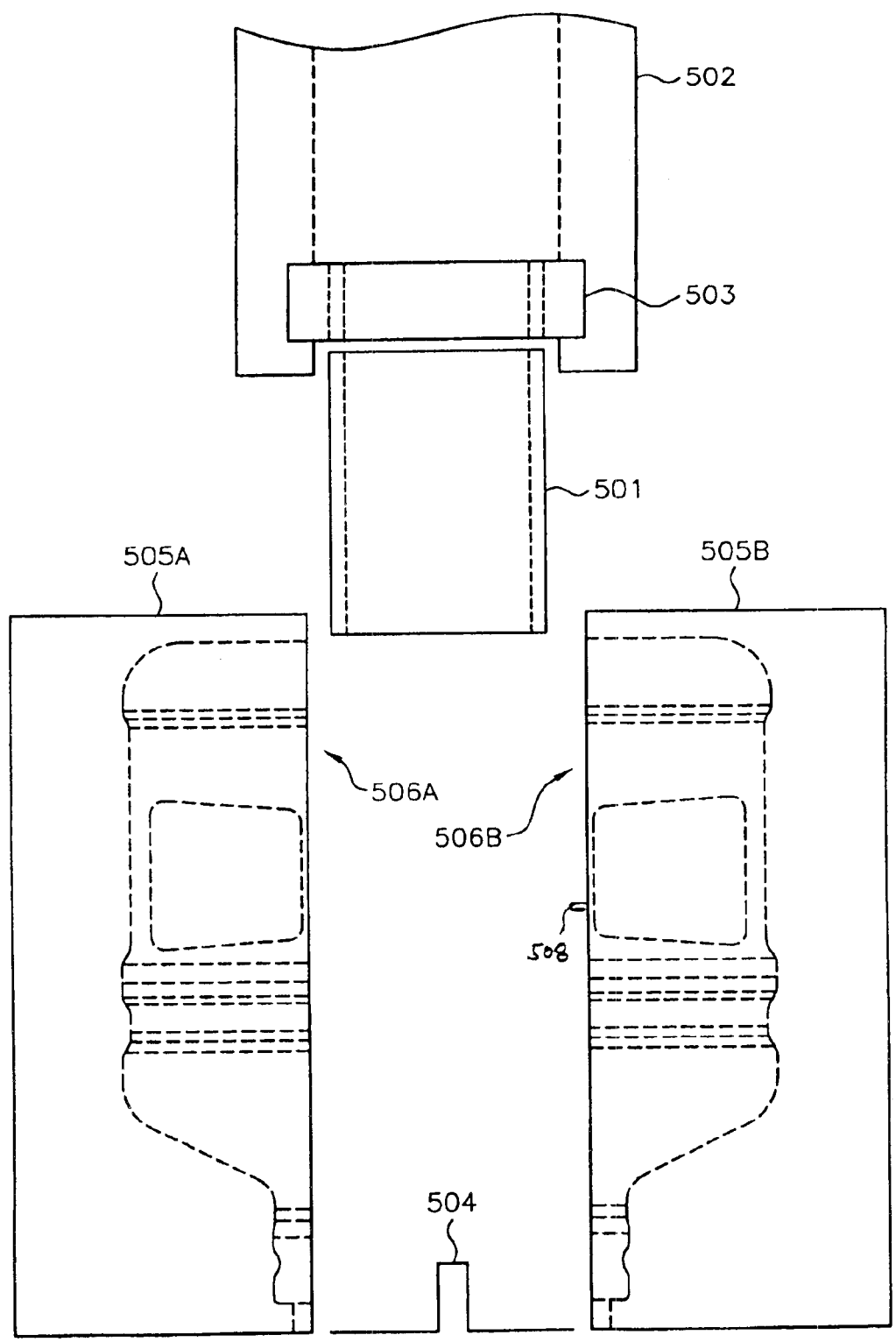
FIG. 5 shows a method for forming the water bottle of FIG. 2 according to one embodiment of the present invention.
Figure 10:
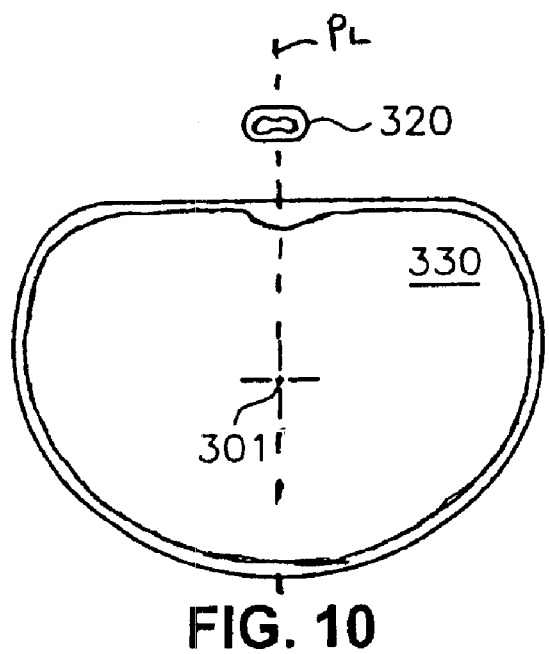
FIG. 10 is a cross-sectional view of the handle and handle well of the water bottle of FIGS. 8–9 taken along axis A—A in FIG. 8.
Figure 11:
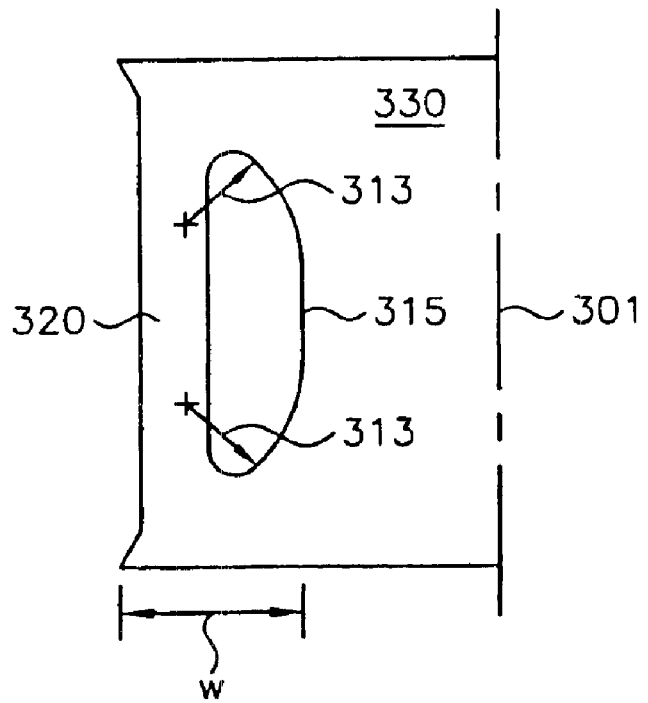
FIG. 11 is a cross-sectional view of the handle and handle well of the water bottle of FIGS. 8–9 taken along axis B—B in FIG. 9.

Referring now to FIG. 5, a method is provided for forming a liquid storage bottle with a closed-off integral handle. A parison 501 is provided using any one of several techniques known in the art of blow molding. The parison can be formed, for example, by filling an accumulator head 502 with molten polymer, then extruding the molten polymer through a die 503 to form the parison (as shown in FIG. 5). Alternatively, the parison 501 can be formed in a continuous molding process, in which a reciprocating screw machine is used to extrude a continuous tube through an extrusion die. The tube is then sheared off to form the parison. The parison 501 drops onto a blow pin 504, which is used to force air against the inside of the parison. Two or more mold parts (i.e., halves) 505A and 505B are pressed together around the parison. Each mold part has a cavity 506A and 506B shaped in the contour of the water bottle to be formed. As shown in FIG. 5, half of the handle is formed in each half of the mold 505A and 505B. When the mold halves are pressed together, the line of contact between the halves is called a parting line, PL, shown in FIGS. 2 and 10. As shown in FIG. 10, the bottle wall is reinforced around aperture (210 in FIG. 3) at this parting line. Preferably, the reinforcement has a thickness of at least twice the thickness of the wall in areas where the wall is not reinforced. The walls of the cavities are tapered, such that the width of the cavities decreases moving away from the parting line. This taper allows the mold halves to separate after the bottle has formed. The angle of taper is known in the art as a draft angle.

In addition to the draft angle, the wall separating the handle from the storage chamber has a taper 300 (shown in FIG. 3), such that the handle indentation decreases in size moving radially inward. Taper 300 prevents a recess or depression where liquid can accumulate when the bottle is inverted. In the exemplary embodiment of the invention, the taper 300 is greater than about three degrees and more preferably greater than about thirty degrees. Alternatively, well 222 may comprise a continuous longitudinal curve each of the tangent lines of which intersect the longitudinal axis 201, at an angle of less than about 87 degrees, more preferably less than about 70 degrees, and most preferably less than about 60 degrees.

In the alternative embodiment shown in FIGS. 6 and 7, a needle 508, shown in FIG. 5, is inserted into the handle section 610 for example, at the point 614, to inflate the handle section when the mold is closed.

In another alternate embodiment of the present invention, a handle part is assembled or molded to a generally cylindrical liquid storage chamber to form an integral assembly. For example, a protrusion or other connecting geometry can be molded at the edges of the handle indentation in the liquid storage chamber. Then, a handle part having a mating connecting geometry, such as a hollow tube, can be snapped onto the protrusions to form an integrated assembly with a closed-off handle. Similarly, indentations could be molded into the liquid storage chamber and protrusions on the handle part could be mated to the indentations to form an integrated assembly. Also, a handle part could be placed in the mold, either manually or by machine, prior to closing the mold on the parison, so that it is molded into a bottle assembly.

FIGS. 8–11 show a bottle formed according to another exemplary embodiment of the present invention. This bottle is blow molded, and fits within a generally cylindrical envelope having a diameter d of about 10.7 inches and a height h of about 19.2 inches. This bottle has a generally cylindrical storage chamber 330 with an opening 305 in one end disposed in a neck having an outside diameter of about 2.2 inches. A base 304 is disposed opposite opening 305 providing a generally level surface capable of supporting the bottle in an upright position. The generally cylindrical storage chamber 330 has a longitudinal axis 301. Opening 305 is approximately co-axially disposed on longitudinal axis 301.

A generally C-shaped well 322 is formed in the wall of generally cylindrical storage chamber 330 comprising a continuous longitudinal curve 315 (best seen in FIG. 8) where each point on the curve has a tangent line which forms an angle of less than about 87 degrees with longitudinal axis 301, preferably less than about 70 degrees, and most preferably less than about 60 degrees. Thus, the included angle between opposing sidewalls of well 322 longitudinally above and below the handle is less than 174 degrees, preferably less than 140 degrees, and most preferably less than 120 degrees. A handle 320 spans well 322 and is separated from the wall of generally cylindrical storage chamber 330 by an aperture 325. Continuous curve 315 extends at least between the two points where handle 320 intersects well 322, and preferably extends into the liquid storage chamber 330. As described above, a parting line runs longitudinally in the bottom of well 322 and in handle 320, and is reinforced around aperture 325. This reinforced parting line and the contour of well 322 provide structural stabilty to the water bottle of the present invention.

Well 322 blends smoothly into the generally cylindrical storage chamber 330, both longitudinally above and below the handle and into the radial wall of generally cylindrical storage chamber 330. The longitudinal curve has a radius at each point along the curve of greater than about 1 inch. The outside radii 313 from inside the bottle are between about 1.5 and about 2.5 inches, preferably about 1.9 inches. Well 322 has a depth of between about 2 inches and about 3 inches, preferably about 2.6 inches (to allow fingers to wrap around handle 320 while providing adequate volume to hold 5 gallons of liquid.

Handle 320 is in fluid communication at its ends with generally cylindrical storage chamber 330. Handle 320 is integral with storage chamber 330, being formed as a portion of the bottle within the bottle envelope. Handle 320 is disposed in well 322 and aperture 325 separating from the wall of generally cylindrical storage chamber 330 from handle 320 has a width of between about 1.000 and 1.5 inches preferably of about 1.2 inches. Handle 320 has a length of between about 4 and about 6 inches, preferably about 4.5 inches and is centered between about 5.75 and about 9.75 inches, preferably about 8.25 inches above base 304. Handle 320 is configured to allow the water-safe plug to pass through it easily. As shown in FIG. 10, the exemplary handle has an oval cross-sectional with dimensions of about 1.25 by about 1.38 inches, sufficiently large to accommodate the plug, which has a diameter of about 1 inch. Handle 320 provides sufficient strength to support the weight of a full water bottle. Also, handle 320 and aperture 325 are desirably sized and contoured to provide a comfortable holding geometry for a human hand.

The open handle 320 and the shallow well 322 provide sufficient storage capacity to hold 5-gallons of water. Also, generally cylindrical storage chamber 330 tapers into the bottle neck at an angle of between about 60 and 65 degrees, preferably about 62.15 degrees providing additional storage capacity. The fill-line f for 5-gallons of water is about 15.9 inches from base 304.

Figure 12:
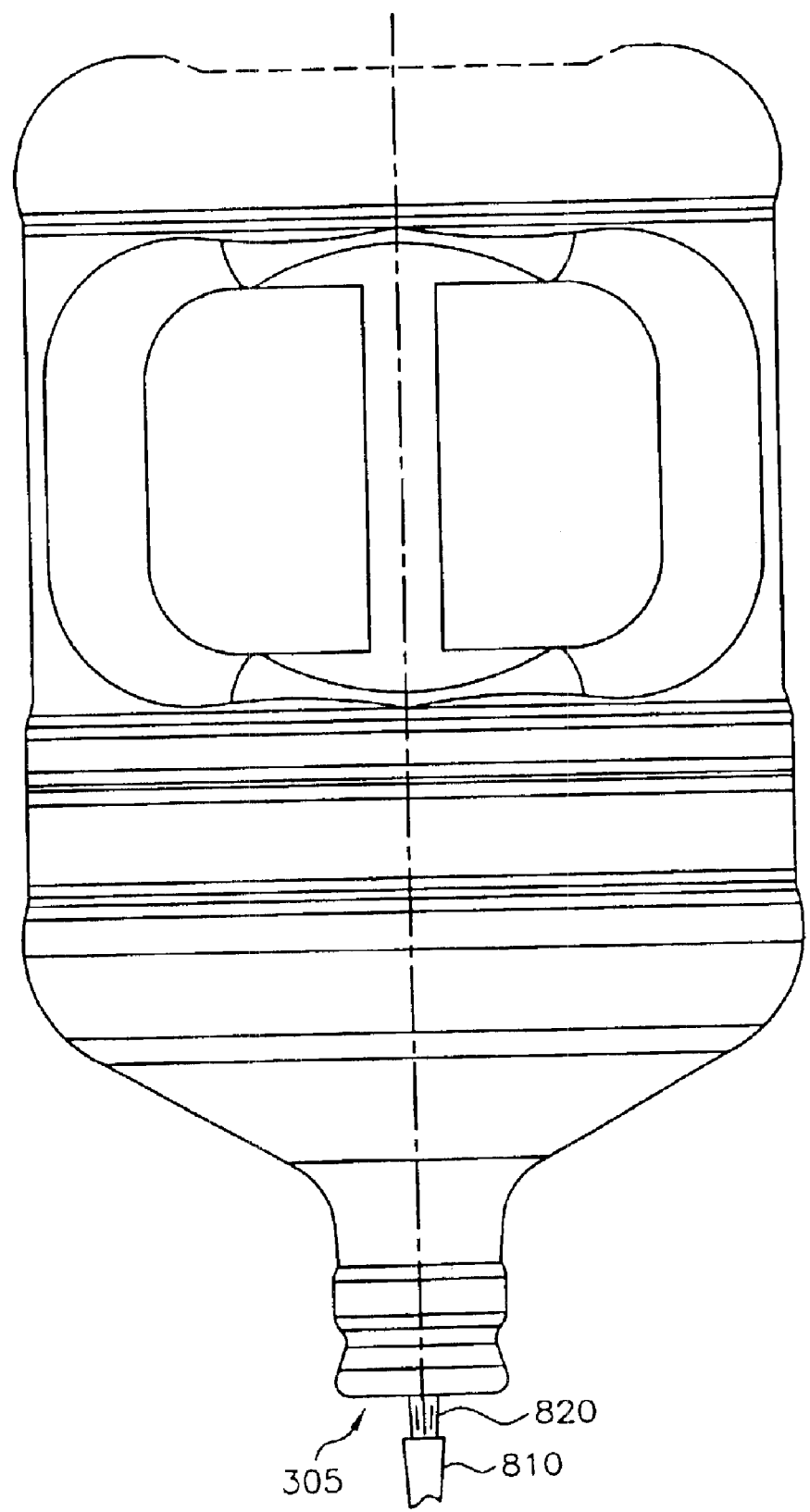
FIG. 12 shows a water bottle according to an exemplary embodiment of the present invention being cleaned.

Referring now to FIG. 12, a water bottle according to an exemplary embodiment of the present invention is easily cleaned using existing methods and equipment. The bottle is inverted with opening 305 positioned over a nozzle 810. Hot water or other cleaning fluid 820 is sprayed from nozzle 810 through opening 205 and into storage chamber 230. The cleaning fluid washes down the walls of storage chamber 230 and through handle 220. The continuous curve of well 210 allows the cleaning fluid to cling via surface tension to the outward slope on the underside of well 210, such that all inside surfaces of the bottle are adequately cleaned. In contrast, existing handle bottles have sharp edged handle wells and portions of the well that are horizontal (i.e., have a tangent line that forms a 90 degree angle with the longitudinal axis of the bottle). Cleaning fluid washing down the wall of existing bottles cascades or falls off of the surface, leaving portions of the inside surface of the bottle inadequately washed.

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A liquid storage bottle comprising:
    a liquid storage chamber having a generally cylindrical shape having a circumference with an opening at one end of the chamber for introducing liquid to the chamber and removing liquid from the chamber;
    a well formed in said liquid storage chamber to accommodate a handle; said well comprising a continuous longitudinal curve, extending from first and second locations along the circumference of the liquid storage chamber, wherein each tangent line of which is at an angle of less than about 87 degrees with the axis of said liquid storage chamber; and
    a handle integral with said chamber and spanning said well from the first location to the second location.

2. The liquid storage bottle of claim 1 wherein said handle is closed off from said liquid storage chamber.

3. The liquid storage bottle of claim 2 wherein said handle is configured at the intersection of the handle and the chamber with effective cross-sectional dimensions that close-off the handle from the liquid storage chamber.

4. The liquid storage bottle of claim 3 wherein the effective cross-sectional dimensions are approximately twice the thickness of a wall of the chamber.

5. The liquid storage bottle of claim 2 wherein said handle is hollow.

6. The liquid storage bottle of claim 1 wherein said handle is in fluid communication with said liquid storage chamber and configured to allow a water-safe plug to pass therethrough.

7. The liquid storage bottle of claim 1 wherein said continuous longitudinal curve comprises radii of at least 1.5 inches at the bottom of said well.

8. The liquid storage bottle of claim 1 wherein said well comprises a continuous longitudinal curve each tangent of which is at an angle of less than 70 degrees with the axis of said liquid storage chamber.

9. The liquid storage bottle of claim 1 wherein said well comprises a continuous longitudinal curve each tangent of which is at an angle of less then about 60 degrees with the axis of said liquid storage chamber.

10. The liquid storage bottle of claim 1 wherein said continuous longitudinal curve extends into said liquid storage chamber longitudinally above and below said well.

11. The liquid storage bottle of claim 1 wherein said bottle has a wall generally having a first thickness; an aperture being formed between said well and said handle with a parting line surrounding said aperture; the wall of said bottle having a second thickness greater than said first thickness to reinforce said wall at said parting line.

12. The liquid storage bottle of claim 11 wherein said second thickness is at least twice said first thickness.

13. A liquid storage bottle comprising:
   a generally cylindrical liquid storage chamber having a circumference and having an opening at one end of the chamber for the introduction and removal of liquid; said generally cylindrical chamber having a well isolated from said chamber and extending into a portion of said chamber; and
   said well comprising a continuous longitudinal curve, extending from first and second locations along the circumference of the liquid storage chamber each of the tangent lines of which intersects the longitudinal axis at an angle of less than about 70 degrees; and
   a handle disposed in said well; said handle being integral with said chamber, spanning the well between said first and second locations, in fluid communication at both ends with said chamber, and separated from said chamber by a dosed aperture formed by said well.

14. The liquid storage bottle of claim 13 wherein each tangent line of said continuous curve intersects the longitudinal axis at an angle of less than about 60 degrees.

15. The liquid storage bottle of claim 13 wherein said well has a depth of less than about one-half of the radius of said generally cylindrical liquid storage chamber and comprises outside radii of greater than about 1.5 inches.

16. The liquid storage bottle of claim 15 wherein said well has a depth of between about 2 and about 3 inches.

17. The liquid storage bottle of claim 13 wherein said handle has an opening with a width of greater than about one inch in each direction.

18. The liquid storage bottle of claim 13 wherein the 5-gallon fill-line is about 15.9 inches from base of the liquid storage chamber.

* * * * *